J. P. FORST.
FLY WHEEL ATTACHMENT FOR MOWERS.
APPLICATION FILED JULY 3, 1908.
911,122.
Patented Feb. 2, 1909.
2 SHEETS—SHEET 1.
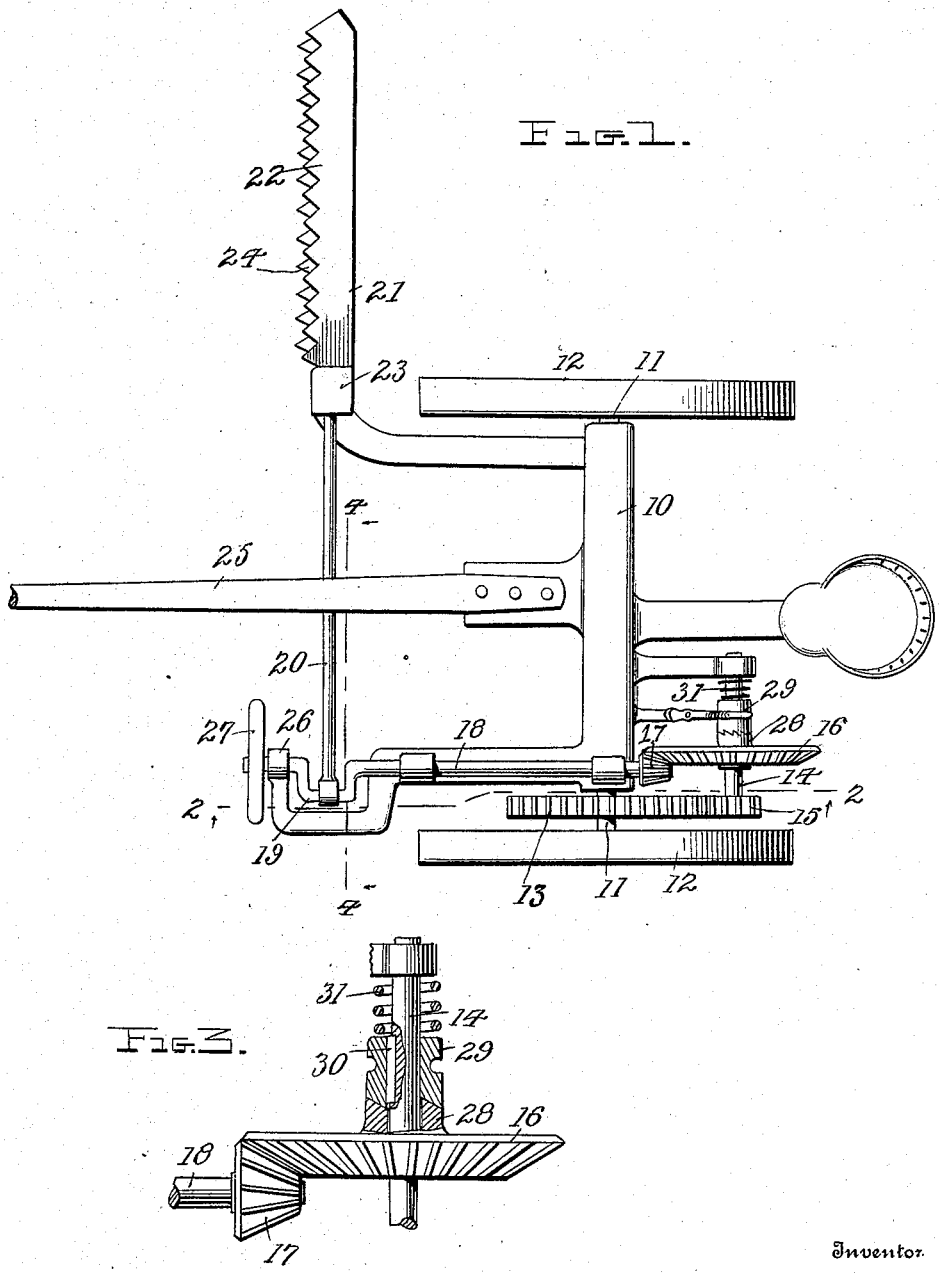

J. P. FORST.
FLY WHEEL ATTACHMENT FOR MOWERS.
APPLICATION FILED JULY 3, 1908.
911,122.
Patented Feb. 2, 1909.
2 SHEETS—SHEET 2.
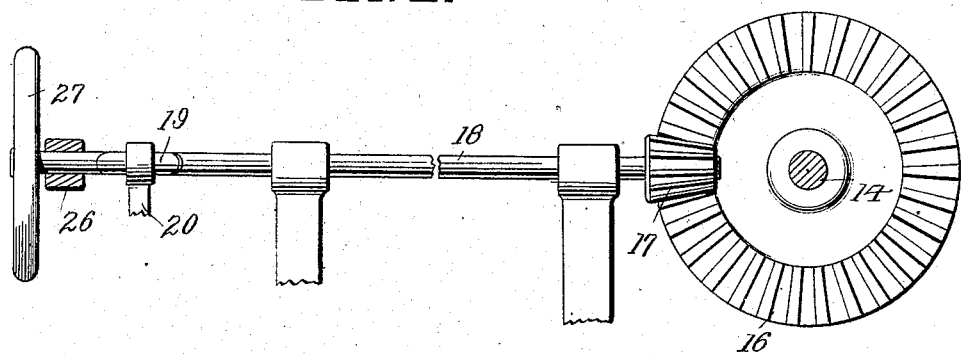
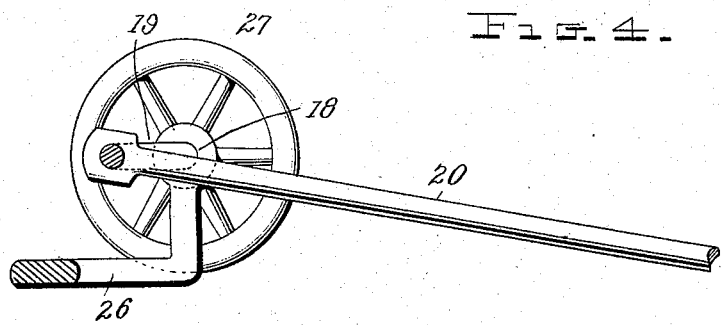

UNITED STATES PATENT OFFICE.

JOHN P. FORST, OF ST. PAUL, NEBRASKA.

FLY-WHEEL ATTACHMENT FOR MOWERS.

No. 911,122.  Specification of Letters Patent.  Patented Feb. 2, 1909.

Application filed July 3, 1908. Serial No. 441,844.

*To all whom it may concern:*

Be it known that I, JOHN P. FORST, a citizen of the United States, residing at St. Paul, in the county of Howard, State of Nebraska, have invented certain new and useful Improvements in Fly-Wheel Attachments for Mowers; and I do hereby declare the following to be a full, clear, and exact description of the invention, such as will enable others skilled in the art to which it appertains to make and use the same.

This invention relates to attachments for mowing machines, reapers, harvesters, and the like, or to all machines of this character employing side pitman driving mechanism, and has for its principal object to provide a simply constructed attachment whereby the sickle knife is rendered self-clearing when the machine stops, so that it is not necessary to clear the knives before again starting the machine.

The invention further consists in certain novel features of construction as hereafter shown and described, and specifically pointed out in the claims.

The improved device may be employed upon any of the ordinary machines for harvesting hay or grain and usually comprising a sickle bar having sickle knives and operative from the ground wheels which support the framework of the machine, and it is not desired therefore to limit the invention to any of the various forms of machines of this character and known by the different names, such as mowers, reapers, harvesters, headers, self-binders, and the like, but for the purpose of illustration the invention is shown applied to an ordinary form of mowing machine.

In the drawings thus employed, Figure 1 is a plan view of a mowing machine with the improvement applied. Fig. 2 is a section on the line 2—2 of Fig. 1. Fig. 3 is an enlarged sectional detail of the gear mechanism and its associate parts. Fig. 4 is a section on the line 4—4 of Fig. 1.

In the drawings the framework of the mowing machine is represented at 10, the axle shaft at 11 mounted for rotation through the framework and with the ground wheels 12 carried by the axle shaft, the main gear wheel at 13, the countershaft at 14 carrying the gear pinion 15 engaging with the gear 13, the main master bevel gear 16 engaging a pinion 17 on the sickle bar driving shaft 18, the latter having a crank 19 to which the pitman 20 is connected at one end and at the other end to the sickle bar 21 carrying the sickle knives 22, the sickle bar operating through the usual sickle head or frame 23 having the divider fingers 24. The draft tongue is represented at 25 and connected to the frame 10 in the usual manner.

The portion of the frame which supports the crank shaft 18 carries a bearing 26 in advance of the crank 19 and the forward end of the crank shaft in advance of the crank is provided with a fly wheel 27. The fly wheel thus operates forwardly of the crank and extends beyond the same laterally, and thus serves as an effectual grass guard thereto.

Connected between the master bevel wheel 16 and the counter-shaft 14 is a clutch device having its teeth inclined on one side.

The clutch device comprises a portion 28 connected to or integral with the gear 16 and a portion 29 slidable upon the shaft 14 but partaking of its rotary motion by the usual arrangement of a feather key or spline, indicated at 30, and with a spring 31 operating to maintain the part 29 yieldably in engagement with the part 28. By this arrangement it will be obvious that when the machine is moving forwardly the gear 13 actuating the pinion 15 and the shaft 14 will cause the clutch member 29 to operate the gear 16 and likewise operate the pitman 20 through the medium of the crank shaft 18 and pinion 17, and this motion will continue so long as the forward motion of the machine continues, the balance wheel 27 accelerating the motion and reducing the power required to operate. When the machine stops, the momentum of the wheel 27 continues the motion of the sickle knives for a limited period of time but sufficiently long to cause the sickle knives to entirely clear themselves from any adhering grass or grain which may remain therein when the machine stops, so that when the machine is ready to proceed again, it is not necessary to clear the sickle knives either by backing the machine and moving forward a short distance before the sickle knives engage the grain to enable them to be cleared of the adhering material, or to clear them manually as is frequently necessary. Two very important results are therefore accomplished by this simple attachment; first, the power required to operate the sickle bar is materially reduced, while the sickle bar is rendered self-clearing when the machine is stopped.

While the arrangement shown is the preferred one, it will be obvious that minor changes may be made within the scope of the appended claims without departing from the principle of the invention or sacrificing any of its advantages.

It may be necessary to locate the clutch device at some other point than that shown when the improvement is attached to other forms of machines than the one shown, as the driving mechanism 16—17 is not always located and arranged as herein shown, and when this takes place it will be obvious that the location of the clutch device will necessarily be changed, but it will be obvious that this would not entail any structural changes in the mechanism and would not affect the desired result, and it is not deemed necessary therefore to specifically illustrate the changes required to enable the device to be thus employed.

The fly wheel 27 should be at least three times the diameter of the stroke of the pitman to secure the best results, but it is not desired to be limited in any manner to any precise proportions of the various parts, as they may be varied as required. By this simple arrangement it will be noted that the operations of the machines are very much simplified and improved, and all tendency to clog obviated, no matter how heavy the grass or grain may be or how badly clogged or lodged.

What is claimed, is:—

1. The combination with a harvesting machine including a supporting frame having a forward extension, ground wheels and a cutter bar and its sickle knives, of a shaft carried by said frame extension and provided with a crank, a pitman connected between said crank and cutter bar, a fly wheel carried by said shaft in advance of said crank and the frame extension, means for transmitting the motion of the ground wheels to the crank shaft, and a clutch device between the operating means and the crank shaft and operating when the crank is rotated in one direction, whereby the momentum of the fly wheel operates the sickle knives after the forward motion of the machine ceases.

2. The combination of a sickle bar and its sickle knives, a crank shaft, a pitman between said crank shaft and said sickle bar, a fly wheel carried by said shaft in advance of its crank and forming a guard thereto, and a clutch between said crank shaft and the operating means thereof and so connected and arranged as to permit the momentum of the fly wheel to operate the sickle knives after the forward motion of the machine ceases.

3. In an apparatus of the class described, a supporting frame including a forwardly extending portion, grain cutting elements carried by said frame extension, means operative by the forward motion of the machine for actuating said cutting elements, a fly wheel carried by said actuating means in advance of its crank and forming a guard thereto, a clutch device between said actuating means and the source of motion and operating to cause the momentum of the fly wheel to operate the sickle knives after the forward motion of the frame ceases.

4. In an apparatus of the class described, a supporting frame including a forwardly extending portion, an axle shaft, ground wheels carried by said axle shaft, a sickle bar having sickle knives, a shaft having a crank and carried by said frame extension, a pitman between said crank and sickle bar, a fly wheel carried by said shaft in advance of its crank and forming a guard thereto, gearing between said axle shaft and crank shaft, and a clutch operating to permit the continued movement of the sickle bar after the forward motion of the machine ceases.

5. The combination with a sickle bar and its sickle knives, of a drive shaft having a crank, means for transmitting motion to the drive shaft, a pitman between the crank and sickle bar, a fly wheel connected to the drive shaft in advance of its crank and forming a guard thereto, and a clutch mechanism operating to permit the continued movement of the sickle bar after the forward movement of the machine ceases.

6. The combination with a sickle bar and its sickle knives, of a drive shaft having a crank, means for transmitting motion to the drive shaft, a pitman between the crank and sickle bar, and a fly wheel connected to the drive shaft in advance of its crank and forming a guard thereto.

In testimony whereof, I affix my signature, in presence of two witnesses.

JOHN P. FORST.

Witnesses:
W. W. JOHNSON,
W. S. POTTS.